(12) United States Patent
Su et al.

(10) Patent No.: US 12,149,699 B2
(45) Date of Patent: Nov. 19, 2024

(54) CONTENT ADAPTATION FOR STREAMING

(71) Applicant: Apple Inc., Cupertino, CA (US)

(72) Inventors: Yeping Su, Palo Alto, CA (US); Xingyu Zhang, Cupertino, CA (US); Chris Chung, San Jose, CA (US); Jun Xin, San Jose, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 56 days.

(21) Appl. No.: 17/492,789

(22) Filed: Oct. 4, 2021

(65) Prior Publication Data
US 2022/0030244 A1    Jan. 27, 2022

Related U.S. Application Data

(62) Division of application No. 15/614,881, filed on Jun. 6, 2017, now Pat. No. 11,166,027.

(60) Provisional application No. 62/348,623, filed on Jun. 10, 2016.

(51) Int. Cl.
*H04N 19/136*   (2014.01)
*G06N 20/00*   (2019.01)
*H04N 19/103*   (2014.01)
*H04N 19/179*   (2014.01)
(Continued)

(52) U.S. Cl.
CPC ........... *H04N 19/136* (2014.11); *G06N 20/00* (2019.01); *H04N 19/103* (2014.11); *H04N 19/179* (2014.11); *H04N 21/23439* (2013.01); *H04N 21/8456* (2013.01)

(58) Field of Classification Search
CPC .. H04N 19/176; H04N 19/147; H04N 19/122; H04N 19/192; H04N 19/137; H04N 19/157; H04N 19/17; H04N 19/61; H04N 19/11; H04N 19/115; H04N 21/252; H04N 21/254; H04N 21/25435; H04N 21/26241;
(Continued)

(56) References Cited

U.S. PATENT DOCUMENTS 8,290,038 B1    10/2012    Wang et al.
8,897,370 B1    11/2014    Wang et al.
(Continued)

*Primary Examiner* — Masum Billah
(74) *Attorney, Agent, or Firm* — BakerHostetler

(57) ABSTRACT

Techniques are disclosed by which a coding parameter is determined to encode video data resulting in encoded video data possessing a highest possible video quality. Features may be extracted from an input video sequence. The extracted features may be compared to features described in a model of coding parameters generated by a machine learning algorithm from reviews of previously-coded videos, extracted features of the previously-coded videos, and coding parameters of the previously-coded videos. When a match is detected between the extracted features of the input video sequence and extracted features represented in the model, a determination may be made as to whether coding parameters that correspond to the matching extracted feature correspond to a tier of service to which the input video sequence is to be coded. When the coding parameters that correspond to the matching extracted feature correspond to the tier of service to which the input video sequence is to be coded, the input video sequence may be coded according to the coding parameters.

30 Claims, 5 Drawing Sheets

(51) Int. Cl.
*H04N 21/2343* (2011.01)
*H04N 21/845* (2011.01)

(58) Field of Classification Search
CPC ....... H04N 21/26283; H04N 21/26606; H04N 21/26613; H04N 21/2665; H04N 21/4104
USPC ......................................................... 375/240
See application file for complete search history.

(56) References Cited

U.S. PATENT DOCUMENTS

| | | | |
|---|---|---|---|
| 9,009,083 B1* | 4/2015 | Shetty | G06F 9/30145 |
| | | | 706/12 |
| 9,161,039 B2 | 10/2015 | Wang | |
| 2003/0202577 A1* | 10/2003 | Mori | H04N 19/192 |
| | | | 375/E7.157 |
| 2015/0058004 A1 | 2/2015 | Dimitriadis et al. | |
| 2015/0319448 A1* | 11/2015 | Ramasubramonian | ...................... |
| | | | H04N 19/85 |
| | | | 375/240.02 |

* cited by examiner

100

200

300

400

500

CONTENT ADAPTATION FOR STREAMING

CLAIM FOR PRIORITY

This application is a divisional of U.S. patent application Ser. No. 15/614,881, filed on Jun. 6, 2017, which claims benefit under 35 U.S.C. § 119(e) of Provisional U.S. Patent Application No. 62/348,623, filed Jun. 10, 2016 and entitled "Content Adaptation for Streaming," the disclosure of which is incorporated herein in its entirety.

BACKGROUND

Video streaming applications often deliver several coded representations of a source video stream to other devices for decoding and display.

In a modern video streaming system, multiple versions of a same video title are encoded (each of the versions is called a tier), segmented into smaller portions, and stored in servers, along with manifest files describing each tier and all the portions within the tier. During playback, a player on a client device would request a specific portion of a specific tier from the server. Which tier to request depends on the player resources: e.g., playback buffer statistics and channel bandwidth.

Since Internet bandwidth and device capabilities vary significantly, many encodes have to be performed to support different resolutions/bit-rates.

There are also a vast number of types of video content available, including feature movies, TV shows, sports content, as well as user generated content. These types of video content exhibit such an array of different characteristics that each of them may require different bit-rates and resolutions to achieve similar quality. For example animated video content (e.g., a cartoon) may have excellent high-definition (HD) 1080p picture quality at 4 Mbps, whereas a live-action feature movie with significant amount of film grain may need 8 Mbps to reach a similar quality at the same HD resolution. On the other hand, at 4 Mbps, the feature movie may need to be coded at a smaller resolution, perhaps 720p, to not show undesirable coding artifacts.

A number of existing video streaming systems use fixed tiers for all titles: for example, 8 Mbps for 1080p, 4 Mbps for 720p, 2 Mbps for 480p, etc. Such a scheme of fixed tiers may be designed to accommodate a worst case with respect to player resources, including playback buffer capabilities and/or available channel bandwidth. Thus a fixed tier scheme may impart a significant degree of wasted resources between the server and client and any infrastructure therebetween. A per-title based tier definition may be substantially more cost-effective, including gains in peak/average bit-rates and resolution.

However, video encoding itself is computationally-intensive, and existing video quality metrics are far from ideal to measure subjective visual quality of videos. Even for a brute-force system that encodes many instances of a video at multiple bit-rates at many resolutions, it is still a challenging problem to pick the optimal tier-definitions from the many instances of the video.

The present disclosure describes a system and relevant techniques that optimally decide the tier definitions on a per-title basis.

DETAILED DESCRIPTION

Embodiments of the present disclosure provide techniques for content adaptation. According to those techniques, features may be extracted from an input video sequence. The extracted features may be compared to features described in a model of coding parameters generated by a machine learning algorithm from reviews of previously-coded videos, extracted features of the previously-coded videos, and coding parameters of the previously-coded videos. When a match is detected between the extracted features of the input video sequence and extracted features represented in the model, a determination may be made as to whether coding parameters that correspond to the matching extracted feature correspond to a tier of service to which the input video sequence is to be coded. When the coding parameters that correspond to the matching extracted feature correspond to the tier of service to which the input video sequence is to be coded, the input video sequence may be coded according to the coding parameters. By employing the above technique, or other techniques described herein, the coding parameter(s) with which to encode an input video sequence may be quickly and efficiently determined.

Figure 1:
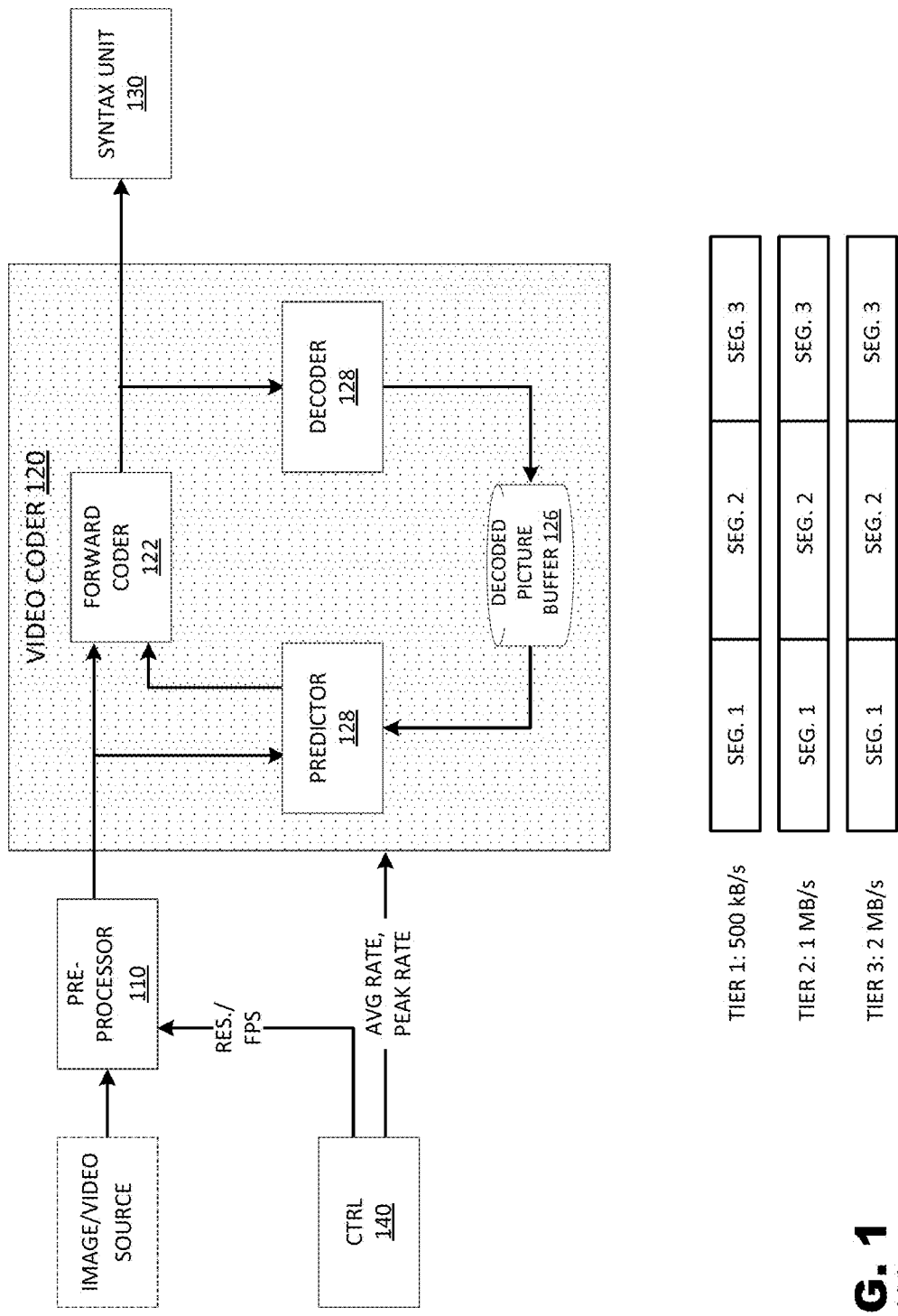
FIG. 1 is a schematic diagram of an example coding system according to an embodiment of the present disclosure.

FIG. 1 is a functional block diagram of a coding system 100 in which the methods and techniques of the present embodiments may be implemented. The system 100 may include a pre-processor 110, a video coder 120, a controller 140, and a syntax unit 130. The pre-processor 110 may receive input video from an image/video source and process the input video to condition the video for further coding. The video coder 120 may perform data compression on the input video to, for example, reduce temporal and/or spatial redundancy in content of the input video. The syntax unit 130 may develop a transmission bit stream from the coded video data for transmission to a decoding system (not shown). The controller 140 may control the operation of the other components of the system 100.

The video coder 120 may comprise a forward coder 122, a decoder 124, a predictor 128, and a decoded picture buffer 126. The forward coder 122 may code frames of the input video with reference to prediction data. The decoder 124 may decode coded frames that are designated as "reference frames" for use in prediction of later-received video. The decoded picture buffer 126 may store decoded reference frame data. The predictor 128 may search the decoded picture buffer 126 for prediction data for use in coding input frames.

The pre-processor 110 may alter input video data prior to the input video data being coded. For example, the pre-processor 110 may alter a frame rate or a frame resolution of input video to conform the input video to requirements set by the controller 140.

Typically, the forward coder 122 and predictor 128 may operate on a pixel block-by-pixel block basis. Input frames may be parsed into spatial arrays of pixel data, called "pixel blocks" for convenience. Pixel blocks may be coded according to a variety of prediction modes, including intra-coding and inter-coding. For inter-coding, for each pixel block, the predictor 128 may search among data of the reference frames stored in the decoded picture buffer for image data that matches the input data. The forward coder 122 may code a residual pixel block, representing differences between the input pixel block and the predicted pixel block, and may output the coded residual along with a motion vector identifying the predicted pixel block. Intra-coding may involve predicting data for an input pixel block data from decoded data of an earlier-coded pixel block of the same frame. The forward coder 122 may apply other coding modes which are not predictive, such as SKIP coding. The coding system 100 may operate according to a coding protocol, such as ITU H.263, H.264 or H.265, that defines operation of the video coder 120.

The video coder 120 may make coding decisions based in part on coding constraints provided by the controller 140. For example, the controller 140 may provide data representing an average bit rate to be met by coded video data and/or a peak bit rate that cannot be exceeded by the coded video data. Based on these constraints, the video coder 120 may select among available coding parameters (including prediction modes and/or quantization parameters) to meet the coding constraints that are imposed.

The coding system 100 may perform tier adaptation. The coding system 100 may code an input video sequence several times, with each coded instance coded according to a different set of performance targets (called, "tiers" for convenience). FIG. 1 illustrates an exemplary set of three tiers, which differ by the average bit rate that is occupied by each tier. In FIG. 1, a first tier represents video coded to a 500 KB/s target bit rate, a second tier represents the video coded to a 1 MB/s target bit rate, and a third tier represents the input video coded to a 2 MB/s target bit rate. Although FIG. 1 illustrates a target bit rate as the performance metric (i.e., a coding parameter) that defines the different tiers, other implementations may use other metrics—video coding quality, frame size, frame rate, etc.—as the performance metric that distinguishes the tiers. It will be noted that tiers need not vary by mutually exclusive performance metrics. For example, two coded videos having different coded bit rates will be considered to belong to different tiers. A third coded video that has the same coded bit rate as one of the first two coded videos but has a different frame rate or different resolution than that video will be considered to be at a third tier. In this respect, the tiers may be defined according to a first or primary performance metric and a second or secondary metric. In the above example, the first performance metric may be the coded bit rates and the second performance metric may be the frame rate or resolution. Since the third coded video has the same coded bit rates as the other two coded videos, the definition of the tiers may resort to the second performance metric, i.e., the frame rate or resolution.

Typically, coded video data is organized according to transmission segments, which represent units of coded video data that can be transmitted separately from each other. A controller 140 may select coding parameters to meet each tier's performance metrics on a segment-by-segment basis.

Tier adaptation processes may identify sets of bit stream parameters, such as average bit rate, peak bit rate, frame rate, and/or frame resolution, in an adaptive stream system to provide end users with different tiers of service each. The bit stream parameters can vary at different rates. For example, bit stream parameters may be selected once for an entire video, they may be redefined at a predetermined temporal rate (for example, once over 5 or 10 seconds, or once over one or several scenes), or they may be redefined for each video segment. The controller 140 may manage tier adaptation for the system 100 in which the controller 140 selects coding parameters for input video. The controller 140 may direct operation of the pre-processor 110 and the video coder 120 with its selections.

Embodiments of the present disclosure provide techniques for selecting bit stream parameters to meet tier performance metrics. One embodiment is based on a machine learning approach such as that illustrated in FIG. 2.

Figure 2:
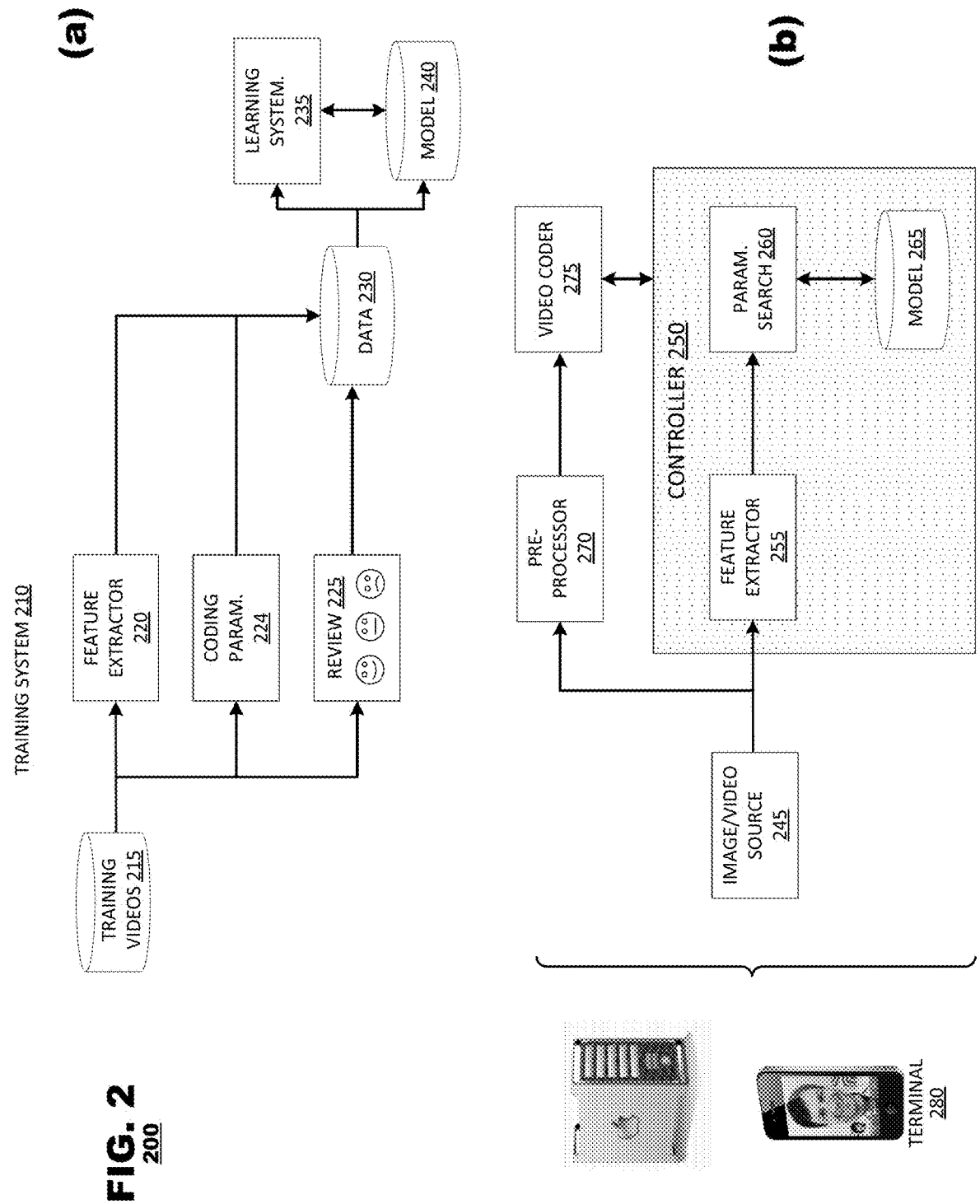
FIGS. 2(a) and 2(b) illustrate schematic diagrams of an example training system and terminal, respectively, according to an embodiment of the present disclosure.

FIG. 2 illustrates a training system 210 that includes a database of training videos 215, a feature extractor 220, a review system 225, a database 230, a learning system 235, and a model database 240. The database of training videos 215 may comprise one or more training videos (including, possibly, source videos) that have been coded according to a variety of different coding parameters 224 corresponding to different performance tiers. The feature extractor 220 may extract various features from the training videos. The review system 225 may log viewer reviews of the quality of the coded videos from the database of training videos 215. The database 230 may receive and store the coding parameter(s) 224 and the outputs from the feature extractor 220 and the review system 225. The learning system 235 may analyze the raw data from the database 230 and generate one or more models stored in the model database 240.

The database of training videos 215 may store a variety of videos that have been coded according to the performance requirements of different tiers supported by coding systems. For a given tier, the database of training videos 215 stores several instances of coded videos in which coding parameter(s) 224 have been varied. For example, the coding parameter(s) 224 according to which several instances of a coded video may vary include bit rate, coding quality, frame size, and frame rate. The training videos are not limited to complete instances of video content (e.g., a complete movie or television program), but may represent portions of videos, including segments, scenes, or other possible apportionment of video data. For example, the average brightness, spatial complexity, object content (e.g., faces) and/or other features may vary from scene to scene.

The feature extractor 220 may identify various features from the training videos from the database of training videos 215. The features may be identified from the training videos at various levels of processing. For example, the features may be extracted from source video of the training videos. This may include an analysis of the source video identifying spatial complexity, motion complexity, luminance variations, color richness, noise patterns, noise levels, or sharpness. The analysis of the source video may further identify the presence of a face or other salient objects in the source video.

As another example, the features may be extracted from a coded video data bit stream from the database of the training videos 215. The coded video data bit stream may be analyzed to identify, for example, average levels of quantization parameters, coding mode assignments, distributions of transform coefficients, and other coding parameters.

As another example, the features may be extracted from reconstructed video from the training videos from the database of training videos 215. The features may be extracted from the reconstructed video by an analysis of coding errors, blockiness, banding artifacts, sharpness, and noise level, to name some examples.

As yet another example, the features may be extracted from multiple videos of the training videos from the database of training videos 215. This may include a comparison of the video data of the above types (e.g., source video, coded video data bit stream, or reconstructed video). For example, a comparison may be performed between source video and reconstructed video. In another example, a comparison may be performed of reconstructed videos obtained by a first coding (A) of the video to reconstructed video obtained from a second coding (B) of the video. The comparison of the videos may be with respect to Peak Signal to Noise Ratio (PSNR), structural similarity (SSIM), color distortion, and/or the difference of features (e.g., the difference of features from the first coding (A) to the second coding (B)).

A difference between the various features may be determined according to one or more of the following equations.

$$\text{mean}(SSIM\_A(t) - SSIM\_B(t)), t = [1, \ldots, N] \quad \text{(Eq. 1)}$$

$$\text{median}(blockiness\_A(t) - blockiness\_B(t)),\\ t = [1, \ldots, N] \quad \text{(Eq. 2)}$$

$$M\text{th percentile of}(PSNR\_A(t) - PSNR\_B(t)),\\ t = [1, \ldots, N]) \quad \text{(Eq. 3)}$$

In Eq. 1, a mean (i.e., an arithmetic average) is taken of a set of difference values for a given attributes between two coding operations over a number of instances of said coding operations. In particular, a mean difference between the SSIM attribute (SSIM_A(t)) of a coding (A) of a video and the SSIM attribute (SSIM_B(t))) of a coding (B) of the video over a number (N) of instances of corresponding codings (A) and (B) is calculated. For example, for t=1, a first difference between the SSIM_A(1) attribute for a first instance of coding (A) and the SSIM_B(1) attribute for the first instance of coding (B) is calculated. For t=2, a second difference between the SSIM_A(2) attribute for the second instance of coding (A) and the SSIM_B(2) attribute for the second instance of coding (B) is calculated. The process may be repeated N times (i.e., until t equals N). A mean difference between the SSIM attributes may be then calculated using the set of the aforementioned differences between the SSIM values for each instance of the codings (A) and (B). Eq. 1 is represented with respect to an SSIM attribute, but may be equally applicable to other attributes, such as PSNR and blockiness.

In Eq. 2, a similar process may be performed as that represented in Eq. 1, except that a median value (i.e., a "middle" value in a set of ordered values) is calculated instead of the mean value of FIG. 1. In addition, Eq. 1 is presented with respect to blockiness values. However, Eq. 2 also may be used with respect to other attributes discussed herein.

In Eq. 3, a similar process may be again performed as that represented in Eq. 1 and Eq. 2, except that an Mth percentile value is calculated instead of a mean or median. The Mth percentile may represent a value (M) below which the given percentage of the instant attribute (PSNR, in this case) may fall. For example, if M=10, then the 10th percentile may represent a PSNR value below which 10 percent of the PSNR values are found. As another example, the 50th percentile of a set is the median value of that set. Eq. 3 also may be used with respect to attributes other than PSNR.

Features extracted by the feature extractor 220 may further include indications of the intended display device (e.g., a mobile device or a large-format display device such as a television display) or intended viewing conditions (e.g., viewing conditions with respect to ambient lighting).

The feature extractor 220 optionally may operate to extract features, such as with respect to resolution, color volume, or color representation, in reconstructed video that are different from those of the source video or encoded video.

Features can themselves be learned from video samples, for instance those trained to detect certain artifacts including blockiness, banding, detail loss, color blotchiness, spatial saliency, or temporal saliency of the source content or the artifacts, etc. Alternatively, features can themselves be objective quality models, trained to correlate objectively predicted values and the subjective labels.

Features can be high level content descriptors, such as genre classification, scene classification, and cues from audio analysis.

Features can be an importance or relevancy indicator of a given content. The importance and relevancy of a given content can be made personalized, depending on a given user's preference and viewing history. The importance and relevancy of a given content can also be made according to some publicly available rankings or lists.

Further, features can be an indication and/or degree of visual saliency present in video content. Visual saliency may refer to a portion or region of interest in video content that tends to attract a viewer's attention. As an example, video content portraying a face may reflect a relatively high degree of visual saliency. As another example, video content with significant object motion may have a higher degree of visual saliency than video content in which objects in the video content are static. A determination of visual salience may be based on motion detection, brightness in the video content, and/or object recognition with respect to the video content.

It will be noted that the above described features are not limited to the type of video data (e.g., source video data, encoded video data, reconstructed video data, etc.) with which the features are discussed. Any of the above described features may be applicable to any of the video data types.

As indicated, the coding parameter(s) 224 may represent one or more of the parameters used to encode the training videos or portions thereof. The coding parameters 224 also may be referred to herein as bit stream parameters. The coding parameters 224 may include bit rate, coding quality, frame size, and frame rate. For example, the bit stream parameter of one training video may indicate that the video was encoded at 500 kB/s, while the coding parameter of another training video may indicate that that training video was encoded at 1 MB/s. The aforementioned training videos may embody common video content coded according to the different coding parameters. That is, these training videos may form tiers of common video content.

As one example, the coding parameter(s) 224 for a given instance of coded video may be embodied as metadata associated with the instance of the coded video. The metadata representing the coding parameter(s) may be embedded with the instance of the coded video or may be ascertained from a different source, such as a database of coding parameters indexed according to the corresponding instance of coded video.

The review system 225 may collect data from viewer observation of the videos. Viewer observation data may be expressed as visual preference labels, which may include absolute quality scores (e.g., video quality was "excellent," "good," "OK," "poor" or "awful"), or relative preference scores (e.g., video A was "better" or "worse" than video B). Viewer observation data may be alternatively represented as a numerical value, such as a numerical value within a range of possible numerical values. For example, in a range spanning from 1 to 100, a numerical value of 100 may represent the best or highest quality of perceptible video quality and a numerical value of 1 may represent the worst or lowest quality of perceptible video quality.

The data collected by the review system 225 may be correlated with one or more of the videos from the database of training videos 215. The data representing viewer observation of the videos may be collected in association with a set of features from the feature extractor 220 and/or a coding parameter 224. That is, the viewer observation data from the review system 225, the features from the feature extractor 220, and/or coding parameters 224 may each correspond to a common segment or other portion (or all) of the video.

The coding parameters 224 and the outputs of the feature extractor 220 and the review system 225 (i.e., the sets of correlated features, bit stream parameters, and reviews) may be stored as raw data in the database 230. The learning system 235 may analyze the raw data in the database 230 to determine a model in the model database 240. For example, a model of the model database 240 may store data indicating that videos having a first feature set and coded according to a first set of bit stream parameters generated video quality that was "good," other data indicating that videos having a first feature set and coded according to a second set of bit stream parameters generated video quality that was "excellent," and a further set of data indicating that videos having the first feature set and coded according to a third set of bit stream parameters generated video quality that was "poor." The model database 240 may store a data model relating the various feature sets identified from the videos of the database of training videos 215, their bit stream parameters, and the associated reviews.

An encoder may use the model to predict the relative quality of encodes. For example, a video (A) having a first feature set has "better" or "worse" subjective quality than a video (B) having a second feature set. The quality can be quantitatively expressed as a degree by which video (A) is better than video B, or a degree by which the predicted coding quality of video (A) is better than the coding quality of video (B).

FIG. 2 also discloses a terminal 280 and, in particular, a controller 250 that may select bit stream parameters for new input data. The terminal 280 may include an image/video source 245, the aforementioned controller 250, a pre-processor 270, and a video coder 275. The controller 250 may include a feature extractor 255, a parameter search system 260, and a database 265 storing a copy of a model from the model database 240 and generated by the training system 210. In some embodiments (not shown), the terminal 280 may include a database storing some or all of the raw data of the database 230 instead of or in addition to the database 265. The image/video source 245 may supply input video data for coding.

The controller 250 may perform analysis of input video data to identify a set of bit stream parameters that is likely to maximize coding quality at the various tiers that the terminal 280 needs to satisfy. The feature extractor 255 may perform analysis of the input video data to identify features therefrom. In this regard, the feature extractor 255 may replicate feature classifications performed by the feature extractor 220 of the training system 210. The parameter search system 260 may apply extracted features to the model database 265 to determine bit stream parameters for coding. Continuing with the example described above, if input video data was identified as having the first feature set, the parameter search system 260 may retrieve from the database 265 data representing the first, second, and third bit stream parameters and the "good," "excellent" and "awful" quality reviews that were associated with them. The controller 250 may select the bit stream parameter that yield the highest quality review (e.g., the second bit stream parameters that generated the "excellent" score) and provide control data to the pre-processor 270 and the video coder 275 to process the input video data accordingly.

The training system 210 and the components of the terminal 280 may operate in conjunction to perform a coding operation on an input video data that optimizes video quality of the coded input video data. In one example operation, a training video of the database of training videos 215 may be processed by the feature extractor 220 to identify one or more features of the training video, as set forth above. The training video may be coded according to one or more coding parameters, which may be now recognized as the coding parameter(s) 224. Viewer observation data (e.g., review data representing a qualitative aspect) with respect to the training video may be collected by the review system 225. The raw data representing correlations of the feature(s), coding parameter(s), and the viewer observation data of the training video may be stored in the database 230. The other training videos of the database of training video 215 may be likewise processed and represented in the database 230. The learning system 235 may analyze and process some or all of the raw data from the database 230 to determine a model, which may be stored in the model database 240. The model may be usable to determine predicted perceptive qualities of input video data coded according to various potential coding parameters.

Continuing the example operation, the controller 250 of the terminal 280 may receive input video data from the image/video source 245. The feature extractor 255 of the controller 250 may analyze the input video data to determine one or more features of the input video data, similar to the operation of the feature extractor 220 of the training system 210. The determined one or more features of the input video data may be provided to the parameter search system 260.

The parameter search system 260 may input the identified one or more features of the input video data to a model of the model database 265 (containing a copy of the corresponding model of the model database 230) of the controller 250. The model may be used to determine a set of potential coding parameters associated with the one or more features of the input video data. Each potential coding parameter may be associated in the model with a corresponding review data indicating a qualitative aspect of the respective potential coding parameter in view of the particular one or more features.

As noted above, the terminal 280 may include a database (not shown) to store some or all of the raw data corresponding to that of the database 230 of the training system 210. This may be in addition or alternative to the inclusion of the model database 265. The raw data in this database of the terminal may comprise data representing correlations between features, review data, and coding parameters.

The parameter search system 260 may determine a coding parameter based on the one or more features supplied to the model and the corresponding review data maintained by the model (and/or the raw data database (not shown) discussed above). For example, the parameter search system 260 may select a coding parameter from the aforementioned set of potential coding parameter. The selection of the coding parameter may be based on the review data associated with the coding parameter. For example, the selected coding parameter of the set of potential coding parameters may be associated with review data indicating the "best" video quality. When the review data is represented as a numerical value, the selected coding parameter may be associated with review data having the highest numerical value. For example, the review data may be represented by a numerical value within a range of 1 to 100, with 1 being the worst or least desirable video quality and 100 being the best or most desirable video quality. Accordingly, the coding parameter associated with review data having a numerical value of, say, 75 may be selected over the coding parameter associated with review data having a numerical value of 25.

The parameter search system 260 may thereby provide the selected coding parameter to the video coder 275. The video coder 275 may code the input video data using the coding parameter provided by the parameter search system 260.

Figure 3:
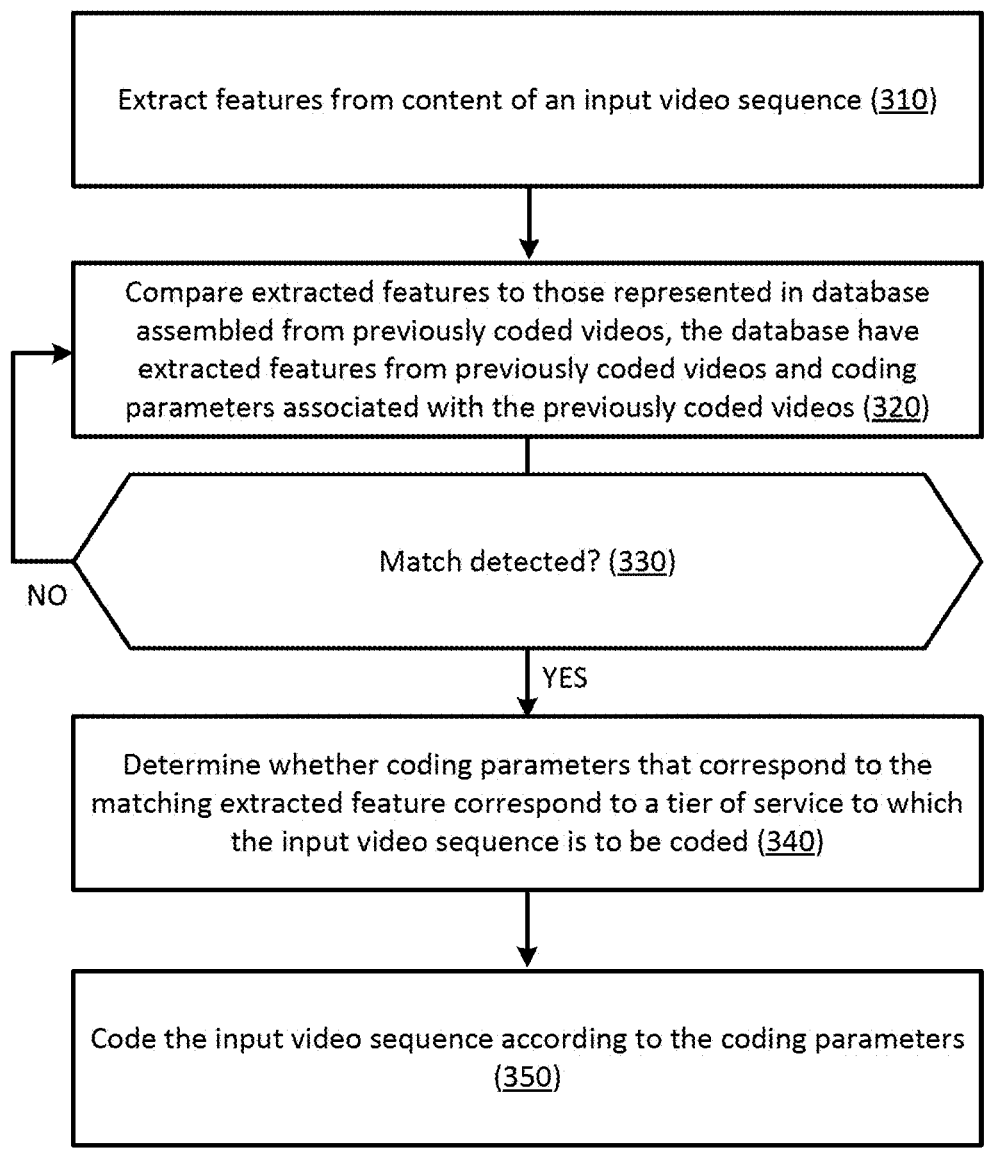
FIG. 3 illustrates a flow diagram of an example method according to an embodiment of the present disclosure.

FIG. 3 provides a method 300 of content adaption according to an embodiment of the present disclosure. Initially, the method 300 may extract features from an input video sequence (block 310). The method 300 may then compare the extracted features to the features described in a database assembled from previously-coded videos (block 320). The database may store data representing extracted features from the previously-coded videos and coding parameters associated with the previously-coded videos. When a match is detected between the extracted features of the input video sequence and the extracted features represented by the database (box 330), the method 300 may determine whether coding parameters that correspond to the matching extracting feature correspond to a tier of service to which the input video sequence is to be coded (box 340). If a match is not detected, the method 300 may return to box 320 to continue the comparison of the extracted features to those represented in the database.

When the coding parameters that correspond to the matching extracted feature correspond to the tier of service to which the input video sequence is to be coded, the method 300 may thereby code the input video sequence according to the coding parameters (box 350). If the coding parameters that correspond to the matching extracted feature do not correspond to the tier of service to which the input video sequence is to be coded (not shown), the operations described in relation to box 360 may be repeated with respect to an alternative tier of service.

The above-referenced database may be determined by and/or stored on a terminal computing device (e.g., the terminal 280 of FIG. 2). Additionally or alternatively, the database may be determined by and/or stored on a server that is separate from the terminal computing device. For example, the database may be determined by the training system 210 (FIG. 2) executing on a separate server. In other instances, one or more of the elements and functionalities described with respect to the terminal 280 may be performed by a server external to the server, such as that embodying the training system 210. In such a case, the terminal 280 may receive and play the already-coded input video sequence.

In an embodiment, the database may store a model of coding parameters generated by a machine learning algorithm from reviews (e.g., reviews from the review system 225 of FIG. 2) of the previously-coded video, extracted features of the previously-coded videos, and coding parameters of the previously-coded videos. The machine learning algorithm may include decision tree, support vector machine, or artificial neural network algorithms, for example.

In an example operation using a machine learning algorithm to determine the model (e.g., the model 240 of the training system 210 of FIG. 2), a training data set may be generated and used to determine the model. The training data set may comprise a plurality of training examples. Each training example may correspond with a training video from the database of training videos 215. Each training example, with respect to the associated training video, may comprise corresponding feature(s) identified by the feature extractor 220, coding parameter(s) 224 used to code the training video, and review data from the review system 225. As such, the feature(s) and coding parameter(s) of a training example may comprise an input object (e.g., a vector representing the same) to the machine learning algorithm and the review data may comprise a desired output value.

In one embodiment, the parameter selection for a video or portion thereof may be performed using a multi-pass technique. In one example, the parameter selection described herein may be applied to a whole video and the whole video may be encoded accordingly (a first pass). The encoded video may be analyzed to determine if it meets the desired review metric or tier of service. Subsequently, a second parameter may be selected based on the analysis of the encoded video resulting from the first encoding. The video may be encoded again using this second parameter (a second pass). In another example, rather than encoding the entire video in the first pass, a subset of the video may be selected and encoded in the first pass. The subset of the video may be contiguous or non-contiguous within the video. For example, 20 percent of the segments (or other apportionment) of the video may be selected and encoded in the first pass. The second pass may encode the entire video based, at least in part, on the analysis of the encoded subset of the video from the first pass.

Figure 4:
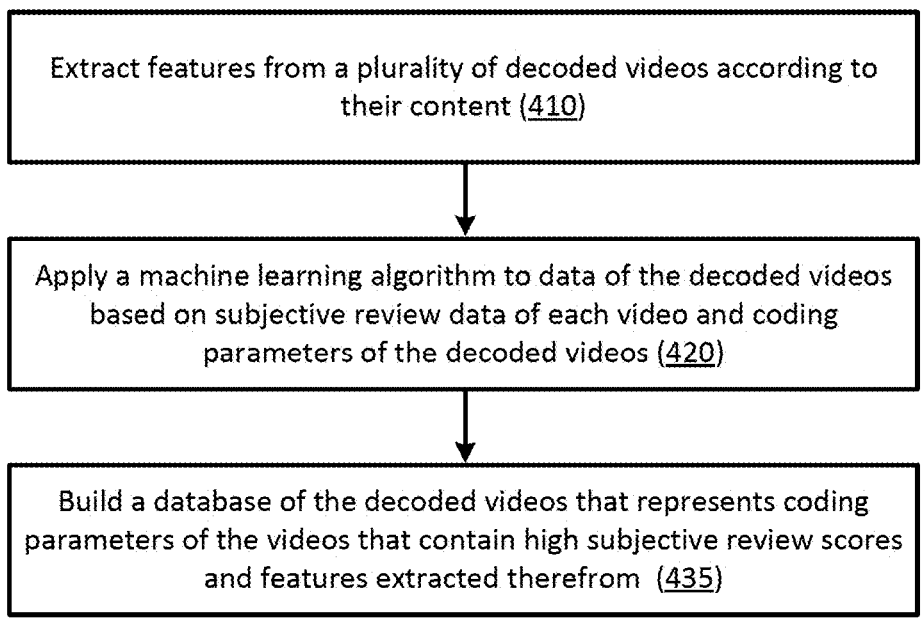
FIG. 4 illustrates a flow diagram of an example method according to an embodiment of the present disclosure.

FIG. 4 illustrates an example method 400 of content adaption according to an embodiment of the present disclosure. The method 400 may extract, from a plurality of video that are decoded from coded video data, features of the decoded videos according to their content (box 410). The method 400 may apply a machine learning algorithm to data of the decoded videos based on subjective review data of each video and coding parameters of the decoded videos (box 420). The method 400 may build a database of the decoded videos that represents coding parameters of the videos that contain high subjective review scores and features extracted therefrom (box 430).

The techniques described herein are expected to provide a fast and/or efficient means of selecting bit stream parameters to code new input data. Although it may be practical when the number of parameter combinations is small, coding input data under each combination on a trial and error basis becomes impractical for larger combinations of parameters. When the number of possible parameter combinations is large, the feature analysis approach described above is expected to converge on a practical parameter set quickly.

In an embodiment, a terminal 280 may code input data using an initial, default set of parameters, and then refine its default parameters using the feature classification and search techniques described herein. It may use coding decisions made during the initial coding as a feature classification set on which the search will be performed. Alternatively, multi-pass coding can be performed in which a first pass encoding uses the default parameters.

When tier adaptation is applied on video units smaller than the full asset, additional manifest or metadata elements can be included with or otherwise provided in association with the video units to facilitate an optimal playback experience on the client side. Such elements include the exact bit stream parameters (e.g., average rate, peak rate, resolution, and/or frames per second) used to encode the corresponding adaptive streaming segments, as well as the number and/or temporal spacing of the video units. Thus, these elements may signal a change in coding parameters to the client allowing the client to anticipate and adapt to a forthcoming parameter change.

Existing adaptive streaming clients decide which tier to play, mainly based on tier bitrates and client buffering status. However, in the present disclosure, visual preferences can be estimated, and included in the manifest file to help a streaming client assess visual impact of different choices, and therefore make informed decisions and improve the viewing experience. The visual preference predictions can include 1) absolute category labels, 2) probability/reliability of absolute category labels, 3) relative preference labels, and/or 4) probability/reliability of relative preference labels.

The use of the above visual preference predictions can be performed at a server, a client, or other devices. For example, the visual preference predictions can be used at the server side to optimally compose a stream from video units of different tiers. In another example, the same can be done at the client to optimize the received stream for the display and adapt to varying scenarios such as the viewing condition, network condition, or power/resource situation.

Feature classification and parameter search may be performed anew on a segment-by-segment basis or on a periodic basis (e.g., every 10 seconds). Alternatively, feature classification and parameter search may be performed across an entire video asset.

In practice, training likely will be performed on videos of relatively short duration, for example 5 or 10 seconds. In some embodiments, however, it may be advantageous to perform tier adaptation on larger granular units, for example, 1-2 minutes or a whole video in order to minimize visual artifacts that may occur, for example, by changes in image resolution. In such embodiments, a controller 250 may aggregate parameter selection over the larger units. Aggregation approaches may include: 1) averaging posterior probabilities, 2) order statistics of posterior probabilities, 3) ordering statistics of high confidence predictions, and 4) averaging posterior probabilities+standard deviation of the posterior probabilities.

In one embodiment, for example, the aforementioned larger unit of a video may include a plurality of segments (or other smaller unit making up the larger unit). The controller 250 may extract one or more features of these segments. A single parameter to be applied to all of the segments may be selected based on the extracted feature(s) of the segments. The selected parameter may be one that results in the optimal subjective review and/or desired tier of service aggregated across the segments. For example, a parameter with which to encode the whole larger unit of video that results in the highest or most desirable subject review metric and/or tier of service averaged across the segments may be selected.

Figure 5:
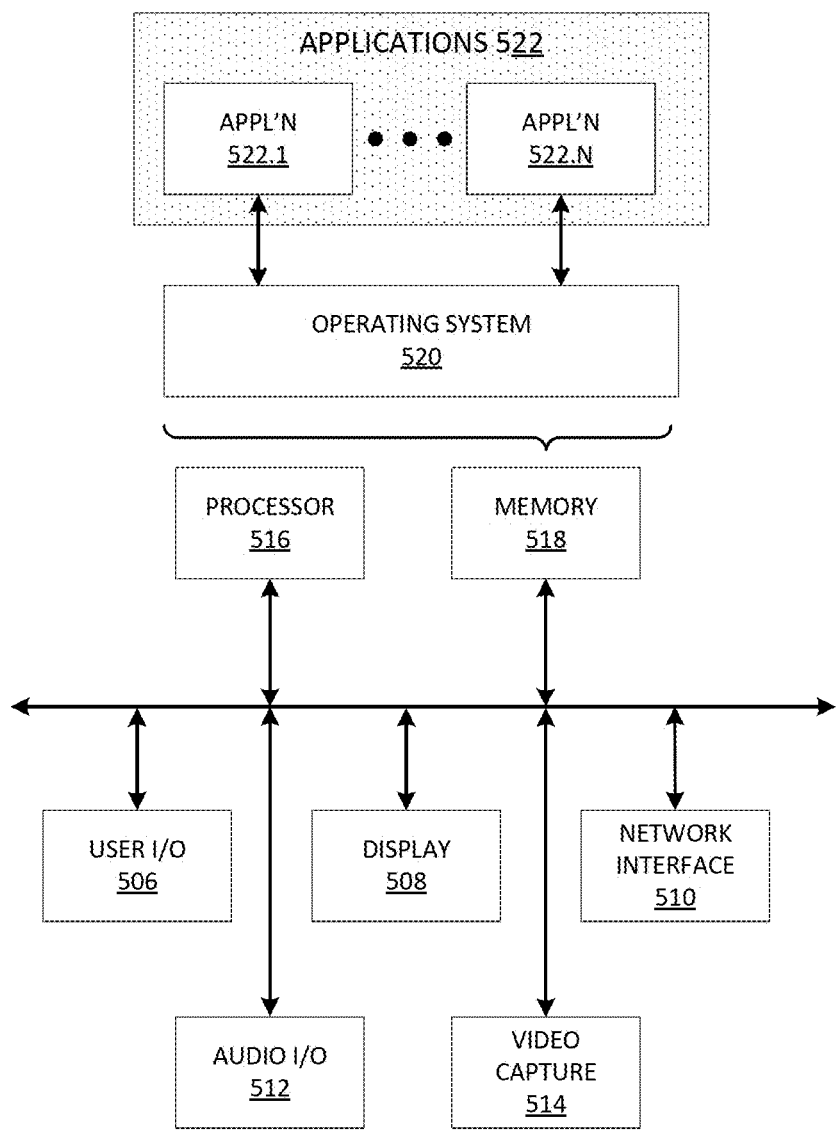
FIG. 5 illustrates a schematic diagram of an example computing device according to an embodiment of the present disclosure.

FIG. 5 is a block diagram of a computing device 500 according to an embodiment of the present disclosure. The computing device 500 may implement any of the systems and components of the present disclosure, including, but not limited to, the system 100 and the video coder 120 of FIG. 1 and the training system 210, the terminal 280, and the controller 250 of FIG. 2. It is contemplated that multiple computing devices 500 may act in conjunction to implement any of the systems or methods described herein.

The computing device 500 may include a processor 516 and a memory 518. The memory 518 may store instructions that, when executed by the processor 516, effectuate any of the methods and techniques described herein. Further, the memory 518 may store program instructions that define an operating system 520 and various applications 522 that are executed by the processor 516. The applications 522 may include a number of applications 522.1-522.N. The applications 522 may comprise, for example, the video coder 120 of FIG. 1 and the training system 210 and controller 250 of FIG. 2. The memory 518 may also store application data for any of the applications 522.

The computing device 500 also illustrates other components that may be common to computing devices used to implement the systems and methods described herein. Such components may include a user input/output 506, a display 508, a network interface 510, an audio input/output 512, and a video capture system 514.

The user input/output 506 may be realized as a pointing device, a keyboard, or a touch-sensitive display, and the like to enable a user to interact with the computing device 500. The display 508 may render video output, such as encoded video data. The network interface 510 may effectuate communication with other computing devices and/or similar systems. For example, the network interface 510 may comprise a wired interface (e.g., an Ethernet interface) to effectuate communication over a wired communication channel. As another example, the network interface 510 may comprise a wireless interface, such as a radio transceiver, to effectuate communication over a wireless communication channel. Such a wireless communication channel may include a cellular network or a Wi-Fi network. The audio input/output 512 may allow a user to provide audio input to the computing device 500 and/or receive audio feedback from the computing device 500. For example, the audio input/output 512 may comprise a microphone and/or a speaker. The video capture system 514 may allow the computing device 500 to receive video input. Accordingly, the video capture system 514 may comprise a camera.

The various systems, methods, and techniques described herein may be implemented in software, such as one or more of the applications 522 of the computing device. Additionally or alternatively, the systems, methods, and techniques described herein may be implemented in dedicated hardware components such as application specific integrated circuits, field programmable gate arrays and/or digital signal processors. Further, these components may be provided as hybrid systems that distribute functionality across dedicated hardware components and programmed general purpose processors, as desired.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A method, comprising:
   in a training system:
   from a plurality of videos that are decoded from coded video data, extracting features of the decoded videos according to their content,
   applying a machine learning algorithm to the extracted features of the decoded videos, subjective review scores of one or more viewers of the decoded videos, and coding parameters used to encode the decoded videos to generate a model of coding parameters, and
   building, based on the model of coding parameters, a database of coding parameters and associated extracted features of the videos associated with high subjective review scores; and
   exporting the database from the training system to a consumer device for use in comparing features extracted from a video captured by the consumer device to the extracted features in a database to determine coding parameters.

2. The method of claim 1, wherein the coding parameters of the decoded videos comprise a bit rate.

3. The method of claim 1, wherein the plurality of videos comprise common video content.

4. The method of claim 1, wherein the coding parameters of the decoded videos comprise at least one of frame resolution, frame rate, average bit rate, and peak bit rate.

5. The method of claim 1, wherein the extracted features comprise at least one of spatial complexity, motion complexity, luminance variations, color richness, noise patterns, noise levels, and sharpness.

6. The method of claim 1, wherein the extracted features comprise at least one of an average level of quantization parameters, coding mode assignments, and distributions of transform coefficients.

7. The method of claim 1, wherein the extracted features comprise at least one of coding errors, blockiness, banding artifacts, sharpness, and noise level.

8. The method of claim 1, wherein the extracted features comprise comparison of respective features of a video of the plurality of videos and at least one of the other videos of the plurality of videos.

9. The method of claim 1, wherein the extracted features comprise at least one of a genre classification of the coded video data, an indication of an intended display device, and an indication of an intended viewing condition.

10. The method of claim 1, wherein the extracted features comprise an indication of an importance of a video of the plurality of videos with respect to at least one other video of the plurality of videos.

11. The method of claim 1, wherein the extracted features are identified from an estimate of visual saliency performed on the decoded videos.

12. The method of claim 1, wherein the extracted features include at least one of the following: spatial complexity of source video data, motion complexity of the source video data, luminance variations of the source video data, color richness of the source video data, noise patterns of the source video data, noise levels of the source video data, and sharpness of the source video data.

13. The method of claim 1, wherein the model includes an input for the extracted features and the coding parameters and includes an output for the subjective review scores.

14. The method of claim 1, wherein the machine learning algorithm includes at least one of: a decision tree, a support vector machine, or an artificial neural network algorithm.

15. The method of claim 1, further comprising:
extracting features of a first video to be encoded;
comparing the features extracted from the first video to the extracted features in the database to determine coding parameters corresponding to a selected tier of service; and
when a match is found in the database, encoding the first video at the selected tier of service with coding parameters associated in the database with the matching features.

16. The method of claim 1, wherein the extracted features include at least one of the following: spatial complexity of source video data, motion complexity of the source video data, luminance variations of the source video data, color richness of the source video data, noise patterns of the source video data, noise levels of the source video data, and sharpness of the source video data.

17. The method of claim 1, wherein:
the plurality of videos are each decoded from coded video data previously coded that at a corresponding tier of service; and
the database on coding parameters includes coding parameters corresponding to extracted features at tiers of service with high subjective review scores.

18. A computing device, comprising:
a processor; and
a memory system in mutual communication with the processor, wherein the memory system stores data that, when executed by the processor, cause the processor to effectuate operations comprising:
in a training system:
from a plurality of videos that are decoded from coded video data, extracting features of the decoded videos according to their content,
applying a machine learning algorithm to the extracted features of the decoded videos, subjective review scores of one or more viewers of the decoded videos, and coding parameters used to encode the decoded videos to generate a model of coding parameters, and
building, based on the model of coding parameters, a database of coding parameters and associated extracted features of the videos associated with high subjective review scores; and
exporting the database from the training system to a consumer device for use in comparing features extracted from a video captured by the consumer device to the extracted features in a database to determine coding parameters.

19. The computing device of claim 18, wherein the coding parameters of the decoded videos comprise a bit rate.

20. The computing device of claim 18, wherein the plurality of videos comprise common video content.

21. The computing device of claim 18, wherein the coding parameters of the decoded videos comprise at least one of frame resolution, frame rate, average bit rate, and peak bit rate.

22. The computing device of claim 18, wherein the extracted features comprise at least one of spatial complexity, motion complexity, luminance variations, color richness, noise patterns, noise levels, and sharpness.

23. The computing device of claim 18, wherein the extracted features comprise at least one of an average level of quantization parameters, coding mode assignments, and distributions of transform coefficients.

24. The computing device of claim 18, wherein the extracted features comprise at least one of coding errors, blockiness, banding artifacts, sharpness, and noise level.

25. The computing device of claim 18, wherein the extracted features comprise comparison of respective features of a video of the plurality of videos and at least one of the other video of the plurality of videos.

26. The computing device of claim 18, wherein the extracted features comprise at least one of a genre classification of the coded video data, an indication of an intended display device, and an indication of an intended viewing condition.

27. The computing device of claim 18, wherein the extracted features comprise an indication of an importance of a video of the plurality of videos with respect to at least one other videos of the plurality of videos.

28. The computing device of claim 18, wherein the extracted features are identified from an estimate of visual saliency performed on the decoded videos.

29. A computer-readable medium storing data that, when executed by a processor, effectuate operations comprising:

in a training system:

from a plurality of videos that are decoded from coded video data, extracting features of the decoded videos according to their content, applying a machine learning algorithm to the extracted features of the decoded videos, subjective review scores of one or more viewers of the decoded videos, and coding parameters used to encode the decoded videos to generate a model of coding parameters, and building, based on the model of coding parameters, a database of coding parameters and associated extracted features of the videos associated with high subjective review scores; and exporting the database from the training system to a consumer device for use in comparing features extracted from a video captured by the consumer device to the extracted features in a database to determine coding parameters.

30. A method, comprising:

extracting features of a first video to be encoded;

comparing the features extracted from the first video to the extracted features in a database to determine coding parameters; and when a match is found in the database, encoding the first video with coding parameters associated in the database with the matching features;

wherein the database is built by:

from a plurality of training videos that are decoded from coded video data, extracting features of the decoded videos according to their content, applying a machine learning algorithm to the extracted features of the decoded videos, subjective review scores of one or more viewers of the decoded videos, and coding parameters used to encode the decoded videos to generate a model of coding parameters, and building, based on the model of coding parameters, the database of coding parameters and associated extracted features of the decoded videos associated with high subjective review scores.

\* \* \* \* \*